United States Patent
Barefoot et al.

(10) Patent No.: US 9,499,431 B2
(45) Date of Patent: Nov. 22, 2016

(54) STRENGTHENED GLASS ARTICLES AND METHODS OF MAKING

(71) Applicant: Corning Incorporated, Corning, NY (US)

(72) Inventors: Kristen L Barefoot, Lawrenceville, PA (US); David John Brockway, Bellefonte, PA (US); James Joseph Price, Corning, NY (US); Jose Mario Quintal, Campbell, NY (US); Ronald Leroy Stewart, Elmira, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/405,041

(22) PCT Filed: Mar. 14, 2013

(86) PCT No.: PCT/US2013/031376
§ 371 (c)(1),
(2) Date: Dec. 2, 2014

(87) PCT Pub. No.: WO2013/184205
PCT Pub. Date: Dec. 12, 2013

(65) Prior Publication Data
US 2015/0183680 A1    Jul. 2, 2015

Related U.S. Application Data

(60) Provisional application No. 61/657,279, filed on Jun. 8, 2012.

(51) Int. Cl.
*C03C 3/095*    (2006.01)
*C03C 21/00*    (2006.01)
*C03C 3/083*    (2006.01)
*C03C 3/087*    (2006.01)
*C03C 3/091*    (2006.01)
(Continued)

(52) U.S. Cl.
CPC ............ *C03C 3/095* (2013.01); *C03C 3/083* (2013.01); *C03C 3/087* (2013.01); *C03C 3/091* (2013.01); *C03C 3/093* (2013.01); *C03C 4/18* (2013.01); *C03C 21/002* (2013.01); *C03C 2204/00* (2013.01)

(58) Field of Classification Search
CPC ............ C03C 3/095; C03C 4/18; C03C 3/091; C03C 3/083; C03C 3/087; C03C 3/093; C03C 21/002; C03C 2204/00
See application file for complete search history.

(56) References Cited

U.S. PATENT DOCUMENTS 7,666,511 B2    2/2010   Ellison et al.
8,158,543 B2    4/2012   Dejneka et al.
(Continued)

OTHER PUBLICATIONS

KR10-2015-7000383 Office Action Dated Jan. 15, 2016.
(Continued)

*Primary Examiner* — Laura Auer
(74) *Attorney, Agent, or Firm* — Timothy M. Schaeberle

(57) ABSTRACT

A strengthened glass article having a central tension that is below a threshold value above which the glass exhibits frangible behavior. The central tension varies non-linearly with the thickness of the glass. The glass article may be used as cover plates or windows for portable or mobile electronic devices such as cellular phones, music players, information terminal (IT) devices, including laptop computers, and the like.

24 Claims, 6 Drawing Sheets

(51) Int. Cl.
  *C03C 3/093* (2006.01)
  *C03C 4/18* (2006.01)

(56) References Cited

U.S. PATENT DOCUMENTS

| | | |
|---|---|---|
| 8,312,739 B2 | 11/2012 | Lee et al. |
| 8,431,502 B2 | 4/2013 | Dejneka et al. |
| 8,561,429 B2 | 10/2013 | Allan et al. |
| 8,586,492 B2 | 11/2013 | Barefoot et al. |
| 8,765,262 B2 | 7/2014 | Gross |
| 8,802,581 B2 | 8/2014 | Dejneka et al. |
| 8,951,927 B2 | 2/2015 | Dejneka et al. |
| 8,969,226 B2 | 3/2015 | Dejneka et al. |
| 9,290,413 B2 | 3/2016 | Dejneka et al. |
| 2010/0035038 A1 | 2/2010 | Barefoot et al. |
| 2010/0047521 A1 | 2/2010 | Amin et al. |
| 2012/0135226 A1 | 5/2012 | Bookbinder et al. |
| 2014/0106172 A1 | 4/2014 | Dejneka et al. |

OTHER PUBLICATIONS

Barsom et al; "Fracture of Tempered Glass", pp. 75-78, J. ACerS, vol. 51 [2], 1968.

Bradt et al; "Controlling the Fragmentation Behavior of Stressed Glass", R. Tandon & S.J. Glass, pp. 77-91 in Fracture Mechanics of Ceramics, ed., Springer Science + Business Media, Inc., New York, 2005.

Burggraaf; The Mechanical Strength of Alkali-Aluminosilicate Glasses After Ion Exchange, Nomograph, N.V. Philips Research, Eindhoven.

Donald; Methods for Improving the Mechanical Properties of Oxide Glasses, J. Mat. Sci., vol. 24, [12], 1989.

Kozlowski et al; Parameters of Chemical Strengening and Impact Performance of Corning Code 8361 (White Crown) and Corning Code 8097 (Photogray®) Lenses, Am. J. of Optometry and Archives of American Academy of Optometry, vol. 50 [4], 1973.

Uhlman et al; "Thermal Tempering of Glass" Chapter 5 in Glass Science and Technology, vol. 5—Elasticity and Strength in Glasses, ed. Academic Press, New York, 1980.

Zijlstra et al; "Fracture Phenomena and Strength Properties of Chemically and Physically Strengthened Glass, II. Strength and Fracture Behavior of Chemically Strengthened Glass in Connection with the Stress Profile", J. Non-Crystalline Solids pp. 163-185 [1], 1969.

Zijlstra et al; "Fracture Phenomena and Strength Properties of Chemically and Physically Strengthened Glass, I. General Survey of Strength and Fracture Behavior of Strengthened Glass", A.L. Zijlstra and A.J. Burggraaf, J. Non-Crystalline Solids pp. 49-68 [1], 1968.

Bouyne et al; "Fragmentation of Thin Chemically Tempered Glass Plates"; Proc. XIX Int. Congr. Glass, Edingurgh, Jul. 1-6, 2001, Glass Technol. 2002, 43C, 300-2.

STRENGTHENED GLASS ARTICLES AND METHODS OF MAKING

CROSS-REFERENCE TO RELATED APPLICATIONS

This application claims the benefit of priority under 35 U.S.C. 371 of the international Application Serial No: PCT/US13/31376, filed on Mar. 14, 2013, which claims the benefit of U.S. Provisional Application No. 61/657,279, filed on Jun. 8, 2012, the contents of which are relied upon and incorporated herein by reference in its entirety.

BACKGROUND

Chemically strengthened glasses have been identified for use in hand held devices, such as mobile phones, media players, and other devices, as well as other applications requiring transparency, high strength and abrasion resistance. However, such glasses are potentially susceptible to frangible behavior—i.e., the glass energetically fragments into a large number of small pieces when impacted with sufficient penetration force.

SUMMARY

Strengthened glasses having a central tension below a threshold value, above which the glass exhibits frangible behavior, are provided and described herein. The threshold central tension for frangible behavior varies nonlinearly with the thickness of the glass. The glasses may be used as cover plates or windows for portable or mobile electronic communication and entertainment devices, such as cellular phones, music players; and information terminal (IT) devices, such as laptop computers and the like.

Accordingly, one aspect of the disclosure is to provide a strengthened glass article having a thickness $t<0.5$ mm and comprising an outer region, the outer region extending from a surface of the article to a depth of layer DOL within the article, wherein the outer region is under a compressive stress CS, and an inner region, wherein the inner region is under a central tension CT, and wherein $-15.7$ (MPa/mm)·t(mm)+52.5 (MPa)<CT (MPa)≤57 (MPa)−9.0 (MPa/mm)·ln(t)(mm)+49.3 (MPa/mm)·ln$^2$(t)(mm), wherein CT is expressed in megaPascals (MPa) and t is expressed in millimeters (mm).

Another aspect of the disclosure is to provide a strengthened glass article having a thickness $t<0.5$ mm and comprising an outer region, the outer region extending from a surface of the article to a depth of layer DOL within the article, wherein the outer region is under a compressive stress CS, and an inner region under a central tension CT, which is expressed in megaPascals (MPa), wherein CT (MPa)>−38.7 (MPa/mm)·ln(t)(mm)+48.2 (MPa). The strengthened glass article is substantially non-frangible when subjected to a point impact that is sufficient to break the strengthened glass article.

Yet another aspect of the disclosure is to provide a strengthened glass article having a thickness $t<0.5$ mm and comprising an outer region extending from a surface of the article to a depth of layer DOL of at least 30 μm within the article, wherein the outer region is under a compressive stress CS of at least 600 MPa, and an inner region, wherein the inner region is under a central tension CT, and wherein $-38.7$ (MPa/mm)·ln(t)(mm)+48.2 (MPa)≤CT (MPa)≤57 (MPa)−9.0 (MPa/mm)·ln(t)(mm)+49.3 (MPa/mm)·ln$^2$(t) (mm). The strengthened glass article is substantially non-frangible and has a frangibility index of less than 3 when subjected to a point impact sufficient to break the strengthened glass article.

These and other aspects, advantages, and salient features will become apparent from the following detailed description, the accompanying drawings, and the appended claims.

DETAILED DESCRIPTION

Figure 1A:
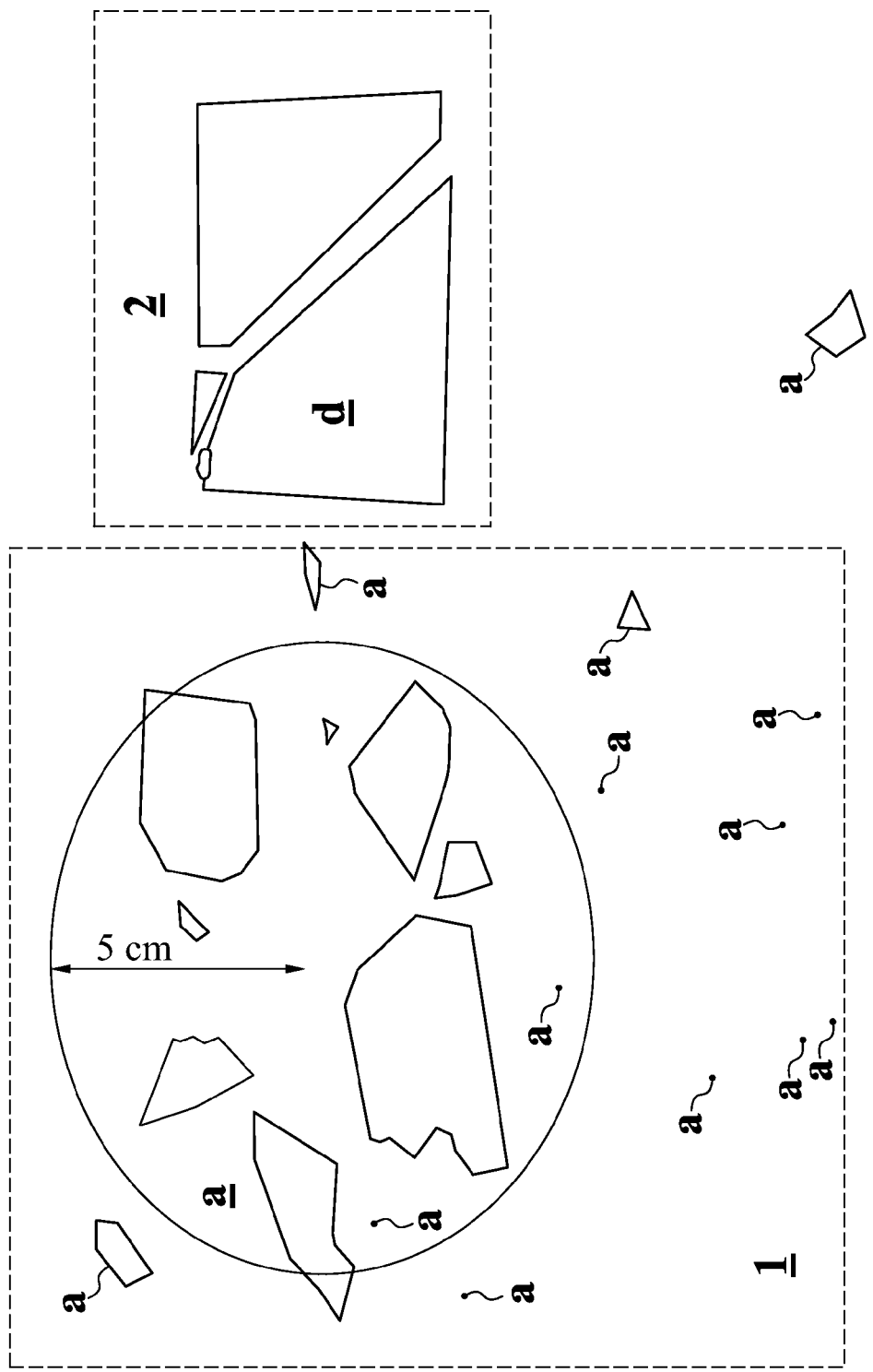
FIG. 1a is a photograph showing strengthened glass articles 1) exhibiting frangible behavior upon fragmentation; and 2) exhibiting non-frangible behavior upon fragmentation.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range, as well as any sub-ranges therebetween.

Referring to the drawings in general, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Frangible behavior (also referred to herein as "frangibility") refers to extreme fragmentation behavior of a glass article. Frangible behavior is the result of development of excessive internal or central tension CT within the article, resulting in forceful or energetic fragmentation of the article upon fracture. In thermally tempered, laminated, or chemically strengthened (e.g., strengthened by ion exchange) glass articles, frangible behavior can occur when the balancing of compressive stresses (CS) in a surface or outer region of the glass article (e.g., a plate or sheet) with tensile stress in the center of the glass plate provides sufficient energy to cause multiple crack branching with ejection or "tossing" of small glass pieces and/or particles from the article. The velocity at which such ejection occurs is a result of the excess energy within the glass article, stored as central tension CT.

The frangibility of a glass article is a function of central tension CT and compressive stress CS. In particular, the central tension CT within a glass article can be calculated from the compressive stress CS. Compressive stress CS is measured near the surface (i.e., within 100 μm), giving a maximum CS value and a measured depth of the compressive stress layer (also referred to herein as "depth of layer" or "DOL"). Compressive stress and depth of layer are measured using those means known in the art. Such means include, but are not limited to, measurement of surface stress (FSM) using commercially available instruments such as the FSM-6000, manufactured by Luceo Co., Ltd. (Tokyo, Japan), or the like, and methods of measuring compressive stress and depth of layer are described in ASTM 1422C-99, entitled "Standard Specification for Chemically Strengthened Flat Glass," and ASTM 1279.19779 "Standard Test Method for Non-Destructive Photoelastic Measurement of Edge and Surface Stresses in Annealed, Heat-Strengthened, and Fully-Tempered Flat Glass," the contents of which are incorporated herein by reference in their entirety. Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2008), entitled "Standard Test Method for Measurement of Glass Stress-Optical Coefficient," the contents of which are incorporated herein by reference in their entirety, and a bulk cylinder method. The relationship between CS and central tension CT is given by the expression:

$$CT=(CS \cdot DOL)/(t-2DOL) \quad (1),$$

wherein t is the thickness of the glass article. Unless otherwise specified, central tension CT and compressive stress CS are expressed herein in megaPascals (MPa), whereas thickness t and depth of layer DOL are expressed in millimeters (mm). The depth of the compression layer DOL and the maximum value of compressive stress CS that can be designed into or provided to a glass article are limited by such frangible behavior. Consequently, frangible behavior is one consideration to be taken into account in the design of various glass articles.

Frangible behavior is characterized by at least one of: breaking of the strengthened glass article (e.g., a plate or sheet) into multiple small pieces (e.g., ≤1 mm); the number of fragments formed per unit area of the glass article; multiple crack branching from an initial crack in the glass article; and violent ejection of at least one fragment a specified distance (e.g., about 5 cm, or about 2 inches) from its original location; and combinations of any of the foregoing breaking (size and density), cracking, and ejecting behaviors. As used herein, the terms "frangible behavior" and "frangibility" refer to those modes of violent or energetic fragmentation of a strengthened glass article absent any external restraints, such as coatings, adhesive layers, or the like. While coatings, adhesive layers, and the like may be used in conjunction with the strengthened glass articles described herein, such external restraints are not used in determining the frangibility or frangible behavior of the glass articles.

Figure 1B:
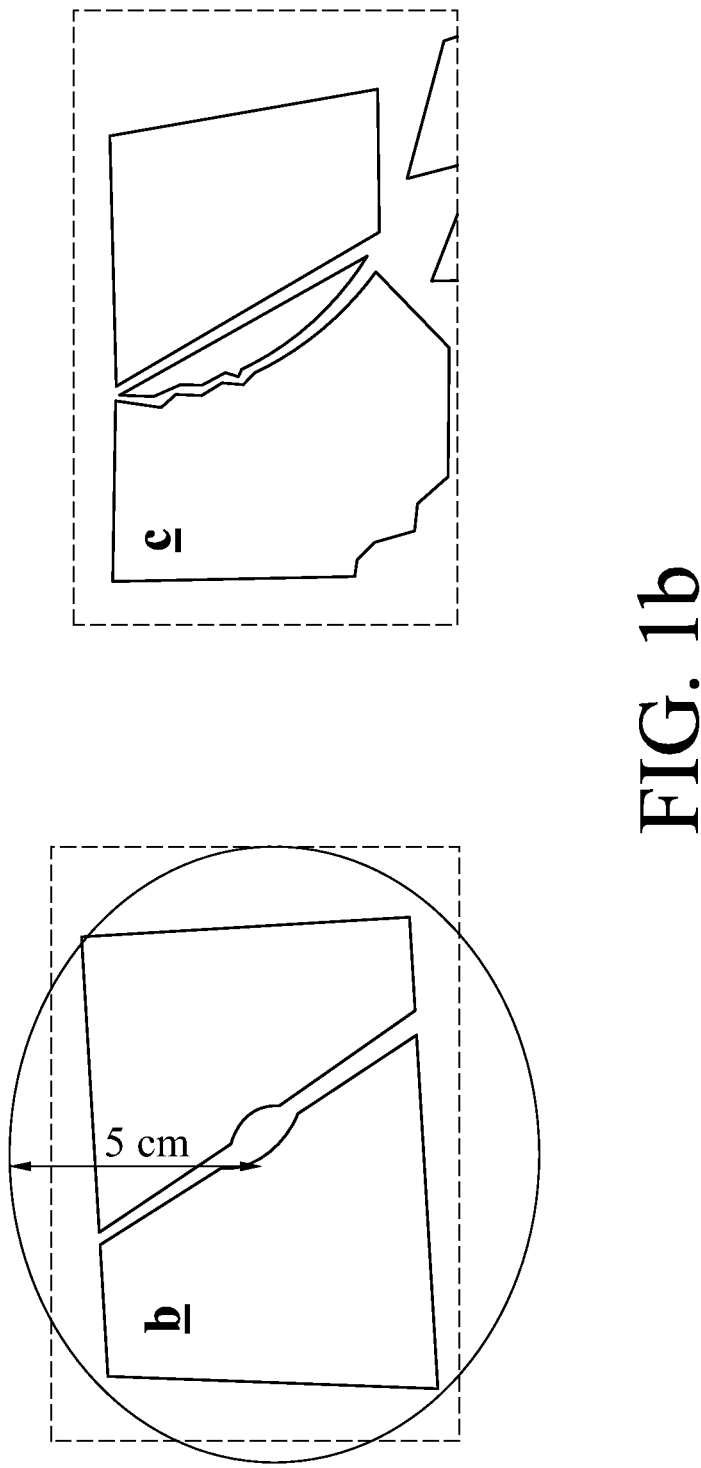
FIG. 1b is a photograph showing strengthened glass sheets that exhibit non-frangible behavior upon fragmentation.
Figure 1C:
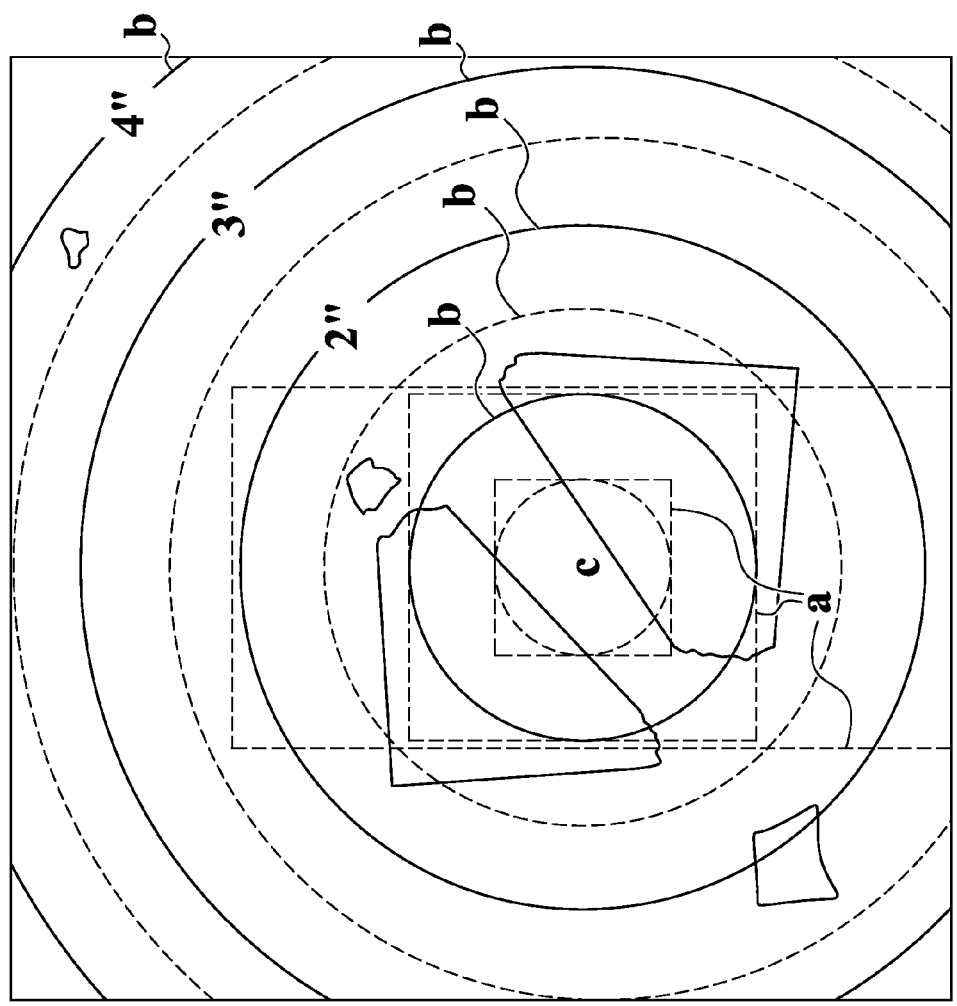
FIG. 1c is a photograph showing a sample after impact located at the center of a grid that is used to measure fragment ejection and locate both the glass sample and impact point on the glass sample.

FIGS. 1a and 1b illustrate examples of frangible behavior and non-frangible/substantially non-frangible behavior of strengthened glass articles upon point impact with a sharp indenter tool such as, for example, an indenter having a silicon carbide tip. The point impact test that is used to determine frangible behavior includes an indenter tool— such as that described above—that is delivered to the surface of the glass article with a force that is just sufficient to release the internally stored energy present within the strengthened glass article, which is either dropped onto the glass surface or weighted to provide the force needed to effect fragmentation of the glass article. That is, the point impact force is sufficient to create at least one new crack at the surface of the strengthened glass sheet and extend the crack through the compressive stress CS region (i.e., depth of layer) into the region that is under central tension CT. The point impact force that is sufficient to create such a crack may be adjusted by adjusting either the weight of the indenter tool or the distance from which the indenter tool is dropped onto the surface of the glass article. The impact energy needed to create or activate the crack in a strengthened glass sheet depends upon the compressive stress CS and depth of layer DOL of the article, and thus upon the conditions under which the sheet was strengthened (i.e., the conditions used to strengthen a glass by ion exchange). Otherwise, each ion exchanged glass plate was subjected to a sharp dart indenter contact sufficient to propagate a crack into the inner region of the plate, the inner region being under tensile stress. The force applied to the glass plate was just sufficient for the crack to reach the beginning of the inner region, thus allowing the energy that drives the crack to come from the tensile stresses in the inner region rather than from the force of the dart impact on the outer surface. In order to accurately measure fragment ejection and reproducibly locate both the glass article and impact point on the article, each sample may be located/placed on a grid in order to ensure such reproducibility. FIG. 1c is a photograph showing a sample (after impact) located at the center of such a grid. Placement lines a ensure proper placement of the glass sample at center c prior to impact and consistent location of the impact point from sample to sample. Concentric circles b emanating from center c are used to measure the ejection distance of each glass fragment. Concentric circles denoting distances of 2, 3, and 4 inches, denoted as 2", 3", and 4", respectively, are also shown in FIG. 1c.

The glass sheets shown in FIGS. 1a and 1b are 50 mm×50 mm ion exchanged alkali aluminosilicate glass plates, each sample having a thickness of 0.5 mm. Each of the samples had a composition of either 66.7 mol % $SiO_2$; 10.5 mol % $Al_2O_3$; 0.64 mol % $B_2O_3$; 13.8 mol % $Na_2O$; 2.06 mol % $K_2O$; 5.50 mol % MgO; 0.46 mol % CaO; 0.01 mol % $ZrO_2$; 0.34 mol % $As_2O_3$; and 0.007 mol % $Fe_2O_3$; or 66.4 mol % $SiO_2$; 10.3 mol % $Al_2O_3$; 0.60 mol % $B_2O_3$; 14.0 mol % $Na_2O$; 2.10 mol % $K_2O$; 5.76 mol % MgO; 0.58 mol % CaO; 0.01 mol % $ZrO_2$; 0.21 mol % $SnO_2$; and 0.007 mol % $Fe_2O_3$. Each of the glass plates shown in FIGS. 1a and 1b was ion exchanged.

Referring to FIG. 1a, glass plate a (FIG. 1a) can be classified as being frangible. In particular, glass plate a fragmented into multiple small pieces that were ejected, and exhibited a large degree of crack branching from the initial crack to produce the small pieces. Approximately 50% of the fragments are less than 1 mm in size, and it is estimated that about 8 to 10 cracks branched from the initial crack. Glass pieces were also ejected about 5 cm from original glass plate a, as seen in FIG. 1a. A glass article that exhibits any of the three criteria (i.e., multiple crack branching, ejection, and extreme fragmentation) described hereinabove is classified as being frangible. For example, if a glass exhibits excessive branching alone but does not exhibit ejection or extreme fragmentation as described above, the glass is still characterized as frangible.

Glass plates b, c, (FIG. 1b) and d (FIG. 1a) are classified as non-frangible or substantially non-frangible. In each of these samples, the glass sheet breaks into a small number of large pieces. Glass plate b (FIG. 1b), for example, has broken into two large pieces with no crack branching; glass plate c (FIG. 1b) has broken into four pieces with two cracks branching from the initial crack; and glass plate d (FIG. 1a) has broken into four pieces with two cracks branching from the initial crack. Based on the absence of ejected fragments (i.e., no glass pieces forcefully ejected more than 2 inches from their original location), no visible fragments≤1 mm in size, and the minimal amount of observed crack branching, samples b, c, and d are classified as non-frangible or substantially non-frangible.

Based on the foregoing, a frangibility index (Table 1) can be constructed to quantify the degree of frangible or non-frangible behavior of a glass, glass ceramic, and/or a ceramic article upon impact with another object. Index numbers, ranging from 1 for non-frangible behavior to 5 for highly frangible behavior, have been assigned to describe different levels of frangibility or non-frangibility. Using the index, frangibility can be characterized in terms of numerous parameters: 1) the percentage of the population of fragments having a diameter (i.e., maximum dimension) of less than 1 mm ("Fragment size" in Table 1); 2) the number of fragments formed per unit area (in this instance, $cm^2$) of the sample ("Fragment density" in Table 1); 3) the number of cracks branching from the initial crack formed upon impact ("Crack branching" in Table 1); and 4) the percentage of the population of fragments that is ejected upon impact more than about 5 cm (or about 2 inches) from their original position ("Ejection" in Table 1).

TABLE 1

Criteria for determining the degree of frangibility and frangibility index.

| Degree of frangibility | Frangibility index | Fragment size (% ≤ 1 mm) | Fragment density (fragments/ $cm^2$) | Crack branching | Ejection (% ≥ 5 cm) |
| --- | --- | --- | --- | --- | --- |
| High | 5 | >20 | >7 | >9 | >6 |
| Medium | 4 | 10 < n ≤ 20 | 5 < n ≤ 7 | 7 < n ≤ 9 | 4 < n ≤ 6 |
| Low | 3 | 5 < n ≤ 10 | 3 < n ≤ 5 | 5 < n ≤ 7 | 2 < n ≤ 4 |
| None | 2 | 0 < n ≤ 5 | 1 < n ≤ 3 | 2 < n ≤ 5 | 0 < n ≤ 2 |
|  | 1 | 0 | n ≤ 1 | n ≤ 2 | 0 |

A frangibility index is assigned to a glass article if the article meets at least one of the criteria associated with a particular index value. Alternatively, if a glass article meets criteria between two particular levels of frangibility, the article may be assigned a frangibility index range (e.g., a frangibility index of 2-3). The glass article may be assigned the highest value of frangibility index, as determined from the individual criteria listed in Table 1. In many instances, it is not possible to ascertain the values of each of the criteria, such as the fragmentation density or percentage of fragments ejected more than 5 cm from their original position, listed in Table 1. The different criteria are thus considered individual, alternative measures of frangible behavior and the frangibility index such that a glass article falling within one criteria level will be assigned the corresponding degree of frangibility and frangibility index. If the frangibility index based on any of the four criteria listed in Table 1 is 3 or greater, the glass article is classified as frangible.

Applying the foregoing frangibility index to the samples shown in FIGS. 1a and 1b, glass plate a fragmented into multiple ejected small pieces and exhibited a large degree of crack branching from the initial crack to produce the small pieces. Approximately 50% of the fragments are less than 1 mm in size and it is estimated that about 8 to 10 cracks branched from the initial crack. Based upon the criteria listed in Table 1, glass plate a has a frangibility index of 4-5, and is classified as having a medium-high degree of frangibility.

A glass article having a frangibility index of less than 3 (low frangibility) may be considered to be non-frangible or substantially non-frangible. Glass plates b, c, and d each lack fragments having a diameter of less than 1 mm, multiple branching from the initial crack formed upon impact and fragments ejected more than 5 cm from their original position. Glass plates b, c, and d are non-frangible and thus have a frangibility index of 1 (not frangible).

As previously discussed, the observed differences in behavior between glass plate a, which exhibited frangible behavior, and glass plates b, c, and d, which exhibited non-frangible behavior, in FIGS. 1a and 1b can be attributed to differences in central tension CT among the samples tested. The possibility of such frangible behavior is one consideration in designing various glass products, such as cover plates or windows for portable or mobile electronic devices such as cellular phones, entertainment devices, and the like, as well as for displays for information terminal (IT) devices, such as laptop computers. Moreover, the depth of the compression layer DOL and the maximum value of compressive stress CS that can be designed into or provided to a glass article are limited by such frangible behavior.

Accordingly, in order to avoid frangibility and be non-frangible or substantially non-frangible (i.e., a probability of 5% or less that a glass plate or glass article will exhibit frangible behavior), a glass article should be designed to have a central tension CT at or below a critical or threshold central tension CT for the glass article to avoid frangibility upon impact with another object, while taking both compressive stress CS and depth of Layer DOL into account. Based on empirical observations of the frangible behavior of glass articles having thicknesses greater than or equal to about 2 mm, the relationship between the "critical" or "threshold" amount of central tension that produces unacceptable frangible behavior and the glass thickness t was heretofore believed to be linear. An example of the threshold central tension CT (also referred to herein as the "threshold CT") at which the onset (also referred to herein as the "critical" or "threshold" central tension value) of unacceptable frangible behavior was believed to occur is plotted as a function of thickness t in FIG. 2 (line 2).

Figure 2:
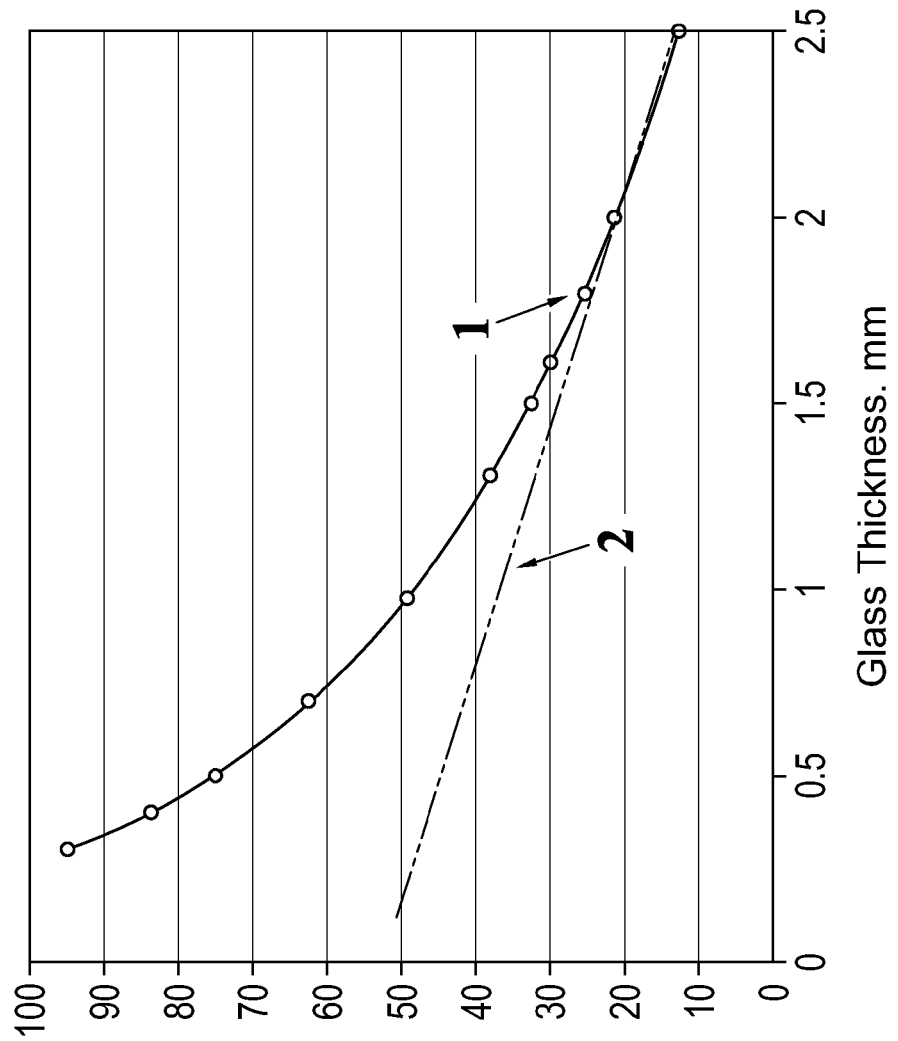
FIG. 2 includes plots of threshold central tension as a function of glass thickness for strengthened alkali aluminosilicate glass articles.

The data represented by line 2 shown in FIG. 2 are based upon behavior that was experimentally observed for a series of chemically strengthened alkali aluminosilicate glass samples, having a composition of either 66.7 mol % $SiO_2$; 10.5 mol % $Al_2O_3$; 0.64 mol % $B_2O_3$; 13.8 mol % $Na_2O$; 2.06 mol % $K_2O$; 5.50 mol % MgO; 0.46 mol % CaO; 0.01 mol % $ZrO_2$; 0.34 mol % $As_2O_3$; and 0.007 mol % $Fe_2O_3$; or 66.4 mol % $SiO_2$; 10.3 mol % $Al_2O_3$; 0.60 mol % $B_2O_3$; 14.0 mol % $Na_2O$; 2.10 mol % $K_2O$; 5.76 mol % MgO; 0.58 mol % CaO; 0.01 mol % $ZrO_2$; 0.21 mol % $SnO_2$; and 0.007 mol % $Fe_2O_3$, that had been strengthened by ion exchange. Each of the samples had a thickness of at least 2 mm. The data represented by line 2 in FIG. 2 indicate that the relationship between the threshold central tension CT (as determined from equation (1) and CS, DOL, and t) and thickness t of the glass is linear (referred to hereinafter as "linear threshold central tension $CT_2$" or "$CT_2$") and is described by the equation:

$$CT_2 \text{ (MPa)} = -15.7 \text{ (MPa/mm)} \cdot t \text{ (mm)} + 52.5 \text{ (MPa)} \quad (2)$$

Equation (2) is derived from experimental compressive stress and depth of layer data that were obtained for chemically strengthened glass samples, each having a thickness of at least 2 mm. Extrapolated to lesser thicknesses, equation (2) provides a lower limit of CT for the strengthened glasses described herein. Due to the relationship between central tension, compressive stress, and depth of layer derived from data obtained for samples in which thickness t≥2 mm and expressed in equation (2), the linear behavior of the threshold $CT_2$ with respect to thickness t limits the amount of compressive stress and depth of layer that may be created. Consequently, design flexibility for certain applications, particularly those in which thinner sheets of glass are used, would be expected to be limited based upon such linear behavior. For example, glass sheets would be strengthened to achieve the CS and DOL values to achieve a central tension that is below the threshold $CT_2$ value predicted by equation (2) and illustrated by line 2 in FIG. 2.

Figure 3:
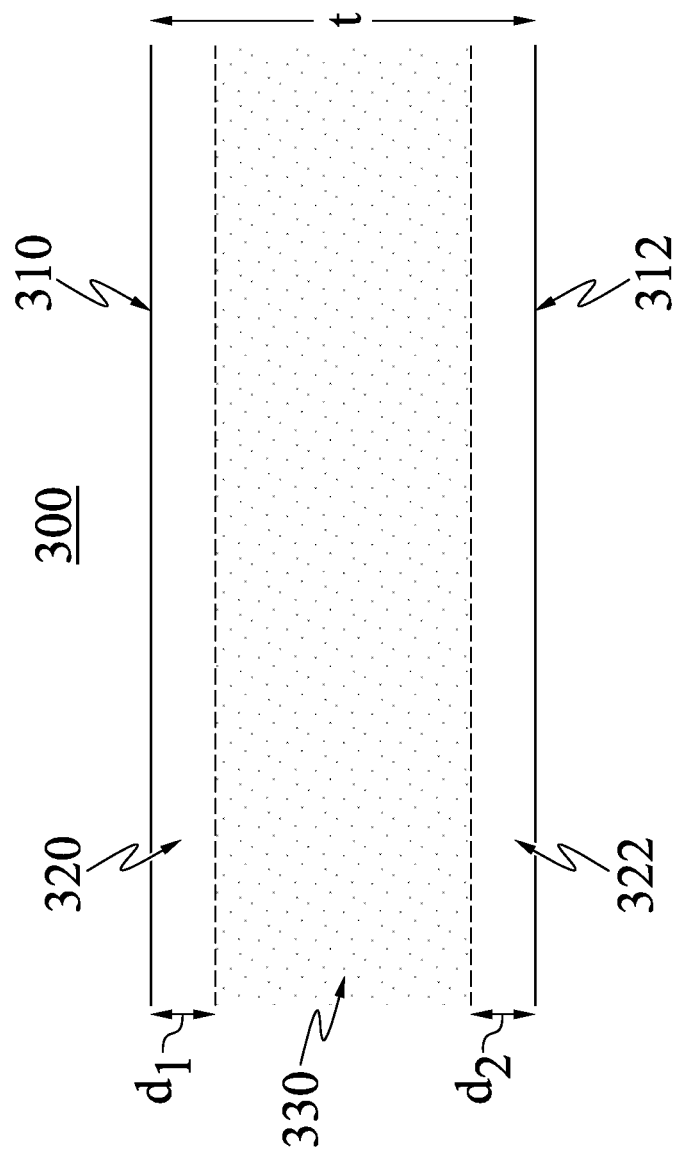
FIG. 3 is a schematic representation of a strengthened glass article.

As described herein, the relationship between the critical or threshold amount of central tension CT that produces frangible behavior in strengthened glass articles and, in particular, glass articles having a thickness t of less than 2 mm, has been found to be nonlinear. Accordingly, a strengthened glass article, such as a strengthened sheet or plate that is substantially non-frangible (i.e., free of frangible behavior), as defined by the criteria described herein, is provided, and schematically shown in FIG. 3. Strengthened glass article 300 has a thickness t, a first compressive layer 320 extending from first surface 310 to a depth of layer $d_1$ into the bulk of the strengthened glass article 300. In the embodiment shown in FIG. 3, glass article 300 also has a second compressive layer 322 extending from second surface 312 to a second depth of layer $d_2$. Strengthened glass article 300 also has a central region 330 that extends from $d_1$ to $d_2$. Central region 330 is under a tensile stress or central tension (CT), which balances or counteracts the compressive stresses of layers 320 and 322. The depth $d_1$, $d_2$ of first and second compressive layers 320, 322 protects the strengthened glass article 300 from the propagation of flaws introduced by sharp impact to first and second surfaces 310, 312, while the compressive stress minimizes the likelihood of a flaw penetrating through the depth $d_1$, $d_2$ of first and second compressive layers 320, 322. The depth DOL of the compressive stress layers 320, 322 is the depth from the surface to the point where the measured compression stress is reduced to zero stress at the boundary with the tensile stress zone (inner region 330). The relationship between central tension CT and compressive stress CS is given by equation (1), previously presented:

$$CT = (CS \cdot DOL)/(t - 2DOL) \quad (1).$$

Referring to FIG. 2, a threshold central tension (threshold CT) at which the onset (also referred to herein as the critical or threshold central tension) of unacceptable frangible behavior actually occurs is plotted as a function of thickness t and represented by line 1 in FIG. 2. Line 1 is based upon experimentally observed behavior of alkali aluminosilicate glasses having a composition of either 66.7 mol % $SiO_2$; 10.5 mol % $Al_2O_3$; 0.64 mol % $B_2O_3$; 13.8 mol % $Na_2O$; 2.06 mol % $K_2O$; 5.50 mol % MgO; 0.46 mol % CaO; 0.01 mol % $ZrO_2$; 0.34 mol % $As_2O_3$; and 0.007 mol % $Fe_2O_3$; or 66.4 mol % $SiO_2$; 10.3 mol % $Al_2O_3$; 0.60 mol % $B_2O_3$; 14.0 mol % $Na_2O$; 2.10 mol % $K_2O$; 5.76 mol % MgO; 0.58 mol % CaO; 0.01 mol % $ZrO_2$; 0.21 mol % $SnO_2$; and 0.007 mol % $Fe_2O_3$ that had been ion exchanged. The data represented by line 1 indicates that the relationship between central tension CT (referred to hereinafter as "nonlinear threshold central tension $CT_1$" or "$CT_1$") and thickness t of the glass is actually nonlinear and described by the equation:

$$CT_1 \text{ (MPa)} \leq -38.7 \text{ (MPa/mm)} \cdot \ln(t)(\text{mm}) + 48.2 \text{ (MPa)} \quad (3).$$

Equation (3) is derived from experimental measurements of compressive stresses CS and depths of layer DOL of ion exchanged alkali aluminosilicate glass samples, each having a thickness of less than about 1.4 mm. It has been observed that glass articles have a nonlinear threshold central tension $CT_1$ that is greater than the linear central tension $CT_2$ defined by the previously expected linear relationship between CT and t represented by equation (2). An unexpected range of central tension $CT_1$ in which unacceptable frangible behavior is minimized or absent is therefore described by the equation:

$$15.7 \text{ (MPa/mm)} \cdot t \text{ (mm)} + 52.5 \text{ (MPa)} \leq CT_1 \text{ (MPa)} \leq -38.7 \text{ (MPa/mm)} \cdot \ln(t)(\text{MPa}) + 48.2 \text{ (MPa)} \quad (4).$$

The nonlinear relationship between the allowable maximum $CT_1$ with glass article thickness, exemplified by line 1 of FIG. 2 and equation (3) is unexpected in light of behavior previously observed for thicker strengthened glass samples of similar or identical compositions. If the relationship between CT and thickness were linear ($CT_2$), as demonstrated by line 2 of FIG. 2 and expressed in equation (2), the CT threshold frangibility for part thicknesses ranging from about 0.2 up to 2 mm would be less than that determined from equation (3), and at least one of CS and DOL would be correspondingly limited. The depth of the compression layer (DOL) and maximum value of compressive stress CS at low thicknesses would also have to be reduced. Such reductions in CS and DOL in these ranges, as dictated by the linear behavior shown in FIG. 2 would limit design flexibility for certain applications.

The previously expected linear behavior of the threshold CT ($CT_2$, expressed by line 2 of FIG. 2) provides no suggestion of a non-linear relationship between the actual threshold CT limit ($CT_1$) for frangibility t (line 1 of FIG. 2) as a function of thickness. To further illustrate this unexpected result, Table 2 lists the actual nonlinear threshold central tension $CT_1$ calculated using equation (3) from line 1 of FIG. 2, described herein, the linear threshold central tension $CT_2$ calculated using equation (2) from line 2 of FIG. 2, and the difference between the threshold CT values ($CT_1 - CT_2$) calculated using equations (2) and (3) for glass selected thicknesses.

TABLE 2

| t (mm) | $CT_1$<br>$-38.7 \ln(t) + 48.2$<br>(MPa) | $CT_2$<br>$-15.7 t + 52.5$<br>(MPa) | $(CT_1 - CT_2)$<br>$(-38.7 \ln(t) + 48.2) -$<br>$(-15.7 t + 52.5)$<br>(MPa) |
|---|---|---|---|
| 1.5 | 32.5 | 28.9 | 3.6 |
| 1.25 | 37.6 | 32.9 | 4.7 |
| 1.0 | 48.2 | 36.8 | 11.4 |
| 0.75 | 59.3 | 40.7 | 18.6 |
| 0.5 | 75.0 | 44.7 | 30.4 |
| 0.45 | 79.1 | 45.4 | 33.7 |
| 0.40 | 83.7 | 46.2 | 37.5 |
| 0.35 | 88.8 | 47 | 41.8 |
| 0.3 | 94.8 | 47.8 | 47.0 |
| 0.25 | 101.8 | 48.6 | 53.2 |
| 0.20 | 110.5 | 49.4 | 61.1 |

TABLE 2-continued

| t (mm) | $CT_1$<br>$-38.7 \ln(t) + 48.2$<br>(MPa) | $CT_2$<br>$-15.7 t + 52.5$<br>(MPa) | $(CT_1 - CT_2)$<br>$(-38.7 \ln(t) + 48.2) -$<br>$(-15.7 t + 52.5)$<br>(MPa) |
|---|---|---|---|
| 0.16 | 119 | 50 | 69 |
| 0.11 | 134 | 50.8 | 83.2 |

As can be seen from the values listed in Table 2, the difference ($CT_1$–$CT_2$) between the expected threshold $CT_2$ predicted (equation (2)) and the actual threshold $CT_1$ predicted by the nonlinear relationship (equation (3)) increases with decreasing thickness t. As CT is related to thickness t, depth of layer DOL, and compressive stress CS (equation (1)), the greater threshold CT values predicted by the nonlinear relationship ($CT_1$; equation (3)) described herein provide a greater range of CS and DOL values that may be used to design and prepare a strengthened glass sheet that exhibits non-frangible behavior; i.e., has a frangibility index that is less than 3. As a result, non-frangible strengthened glass articles can be made at certain thicknesses and strengthened so as to have a greater threshold central tension CT than previously believed possible.

In one embodiment, the strengthened glass article 300 is substantially non-frangible, or free of frangible behavior, as described hereinabove. That is, strengthened glass article 300 has a frangibility index, as described in Table 1 herein, of less than 3. Upon impact with a force sufficient to cause fragmentation of strengthened glass 300, the percentage $n_1$ of the population of the fragments having a diameter (i.e., maximum dimension) of less than or equal to 1 mm ("Fragment size" in Table 1) is less than or equal to 5% (i.e., $0\% \leq n_1 \leq 5\%$); the number of fragments formed per unit area (in this instance, $cm^2$) $n_2$ of the sample ("Fragment density" in Table 1) is less than or equal to 3 fragments/$cm^2$; the number of cracks $n_3$ branching from the initial crack formed upon impact ("Crack branching" in Table 1) is less than or equal to 5 (i.e., $0 \leq n_3 \leq 5$); and the percentage of the population of fragments $n_4$ that is ejected upon impact more than about 5 cm (or about 2 inches) from their original position ("Ejection" in Table 1) is less than or equal to 2% (i.e., $0\% \leq n_4 \leq 2\%$).

The data shown in line 2 of FIG. 2 provide no suggestion of non-linear behavior of the threshold CT limit $CT_1$ for frangibility as a function of thickness. As can be seen from the values listed in Table 2, the difference between the threshold CT predicted by equation (2) and the threshold CT predicted by the nonlinear relationship (equation 3) increases with decreasing thickness t.

Figure 4:
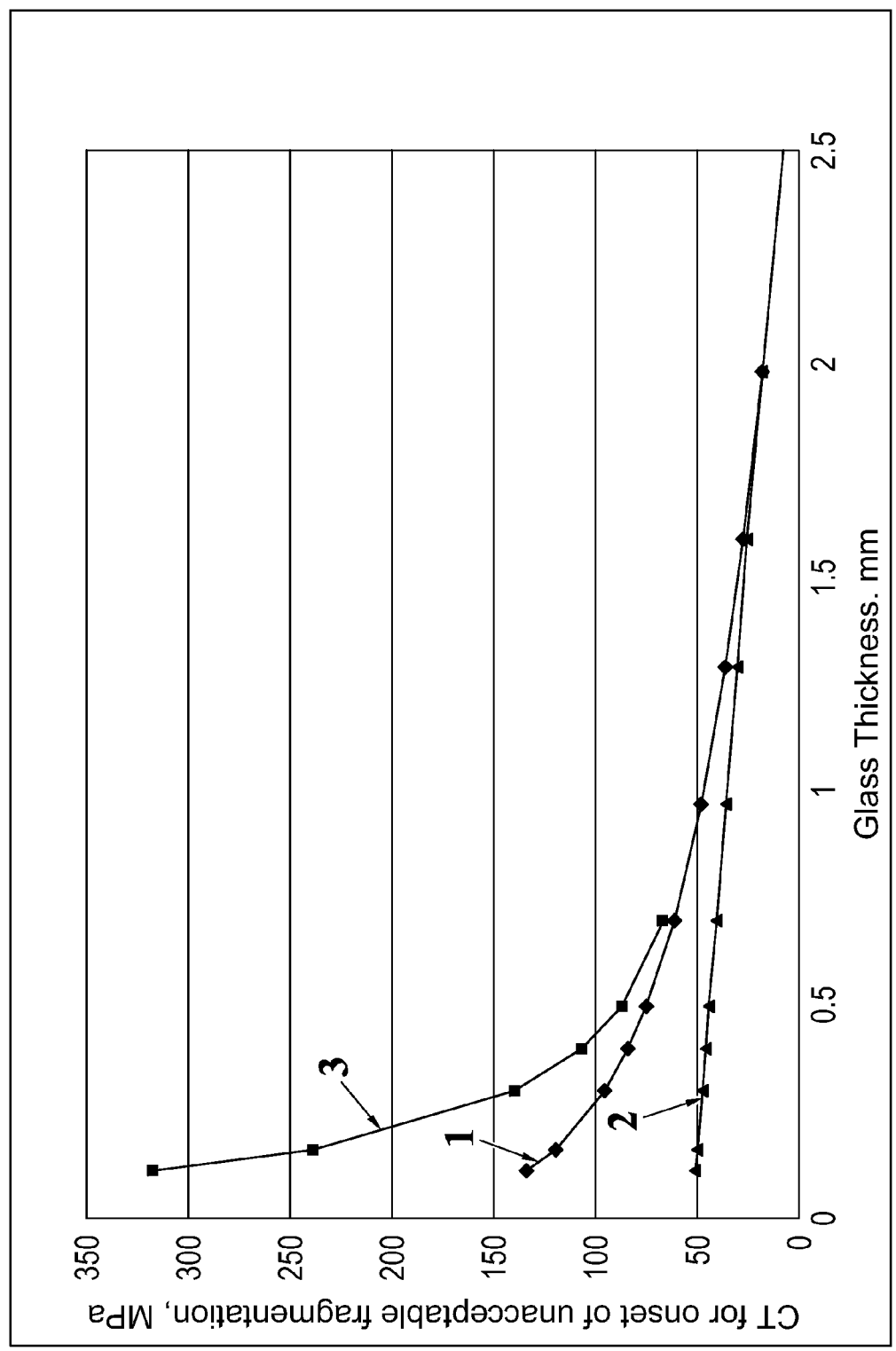
FIG. 4 includes plots of threshold central tension as a function of glass thickness for strengthened alkali aluminosilicate glass articles.

It has been further discovered that in order to avoid frangibility, glass articles can be designed to have a central tension CT at lower thicknesses which are actually above the nonlinear central tension threshold previously believed to produce unacceptable frangible behavior (i.e., for lower thicknesses, glasses may have central tensions above those plotted as a function of thickness t in FIG. 2 (line 2)). Referring to FIG. 4, a threshold central tension at which the onset of unacceptable frangible behavior actually occurs in glass articles having thicknesses at or below 0.75 mm is plotted as a function of thickness t and represented by line 3. Line 3 is based upon experimentally observed behavior of alkali aluminosilicate glasses having a composition of either: 1) from about 60 mol % to about 70 mol % $SiO_2$; from about 6 mol % to about 14 mol % $Al_2O_3$; from 0 mol % to about 15 mol % $B_2O_3$; from 0 mol % to about 15 mol % $Li_2O$; from 0 mol % to about 20 mol % $Na_2O$; from 0 mol % to about 10 mol % $K_2O$; from 0 mol % to about 8 mol % MgO; from 0 mol % to about 10 mol % CaO; from 0 mol % to about 5 mol % $ZrO_2$; from 0 mol % to about 1 mol % $SnO_2$; from 0 mol % to about 1 mol % $CeO_2$; less than about 50 ppm $As_2O_3$; and less than about 50 ppm $Sb_2O_3$; wherein 12 mol % $\leq Li_2O + Na_2O + K_2O \leq 20$ mol % and 0 mol % $\leq MgO + CaO \leq 10$ mol; or 2) from about 61 mol % to about 75 mol % $SiO_2$; from about 7 mol % to about 15 mol % $Al_2O_3$; from 0 mol % to about 12 mol % $B_2O_3$; from about 9 mol % to about 21 mol % $Na_2O$; from 0 mol % to about 4 mol % $K_2O$; from 0 mol % to about 7 mol % MgO; and 0 mol % to about 3 mol % CaO; or 3) at least about 50 mol % $SiO_2$ and at least about 11 mol % $Na_2O$; from about 7 mol % to about 26 mol % $Al_2O_3$; from 0 mol % to about 9 mol % $B_2O_3$; from 0 mol % to about 2.5 mol % $K_2O$; from 0 mol % to about 8.5 mol % MgO; and from 0 mol % to about 1.5 mol % CaO.

The data represented by line 3 indicates that the relationship between central tension CT and thickness t of the glass is, at least for thicknesses less than 0.75 mm, above line 1 in FIG. 2 ($CT_1$ (MPa) $\leq -38.7$ (MPa/mm)·ln(t)(mm)+48.2 (MPa)) and described by the equation:

$$CT_3 \text{ (MPa)} \leq 57 \text{ (MPa)} - 9.0 \text{ (MPa/mm)} \cdot \ln(t)(\text{mm}) + 49.3 \text{ (MPa/mm)} \cdot \ln^2(t)(\text{mm}) \quad (5).$$

Equation (5) is derived from experimental measurements of compressive stresses CS and depths of layer DOL of ion exchanged alkali aluminosilicate glass samples, each having a thickness equal to or less than about 0.75 mm. It has been observed that glass articles have a nonlinear threshold central tension $CT_3$ that is greater than the linear central tension $CT_2$ defined by the previously expected linear relationship between CT and t represented by equation (1), and for thicknesses less than 0.75 mm, greater than the nonlinear central tension $CT_1$ represented by equation (3). An unexpected total range of central tension $CT_3$ in which unacceptable frangible behavior is minimized or absent (a probability of 5% or less that a glass plate or glass article will exhibit frangible behavior) is therefore described by the equation:

$$-15.7 \text{ (MPa/mm)} \cdot t \text{ (mm)} + 52.5 \text{ (MPa)} < CT_3 \text{ (MPa)}$$
$$\leq 57 \text{ (MPa)} - 9.0 \text{ (MPa/mm)} \cdot \ln(t)(\text{mm}) + 49.3 \text{ (MPa/mm)} \cdot \ln^2(t)(\text{mm}) \quad (6).$$

An unexpected range of central tension $CT_3$ above $CT_1$ in which unacceptable frangible behavior is minimized or absent (a probability of 5% or less that a glass plate or glass article will exhibit frangible behavior) is described by the equation:

$$-38.7 \text{ (MPa/mm)} \cdot \ln(t)(\text{mm}) + 48.2 \text{ (MPa)} \leq CT_3 \text{ (MPa)}$$
$$\leq 57 \text{ (MPa)} - 9.0 \text{ (MPa/mm)} \cdot \ln(t)(\text{mm}) + 49.3 \text{ (MPa/mm)} \cdot \ln^2(t)(\text{mm}) \quad (7).$$

The relationship between the allowable maximum $CT_3$ with glass article thickness, exemplified by line 3 of FIG. 4 and equation (5) is unexpected in light of behavior previously observed for thicker strengthened glass samples. To further illustrate this unexpected result, Table 3 includes actual nonlinear threshold central tension $CT_3$ measured on samples as low as 0.3 mm thick.

TABLE 3

| t (mm) | $CT_1$<br>$-38.7 \ln(t) + 48.2$<br>(MPa) | $CT_3$<br>$57 - 9.0 \cdot \ln(t) +$<br>$49.3 \cdot \ln^2(t)$ (MPa) |
|---|---|---|
| 0.75 | 59.3 | 64 |
| 0.7 | 62 | 67 |
| 0.5 | 75.0 | 87 |

TABLE 3-continued

| t (mm) | $CT_1$<br>$-38.7 \ln(t) + 48.2$<br>(MPa) | $CT_3$<br>$57 - 9.0 \cdot \ln(t) +$<br>$49.3 \cdot \ln^2(t)$ (MPa) |
|---|---|---|
| 0.45 | 79.1 | 95.6 |
| 0.4 | 83.7 | 106.6 |
| 0.35 | 88.8 | 120.8 |
| 0.3 | 94.8 | 132 |
| 0.25 | 101.8 | 164.2 |
| 0.2 | 110.5 | 199.2 |
| 0.16 | 119 | 250 |
| 0.11 | 134 | 312 |

Table 3 reflects the difference between the threshold $CT_1$ (equation (3)) and the threshold $CT_3$ (equation (5)) with decreasing thickness t at and below 0.75 mm. As CT is related to thickness t, depth of layer DOL, and compressive stress CS (equation (1)), the greater threshold CT values predicted by the nonlinear relationship ($CT_3$, equation (5)) described herein provide a greater range of CS and DOL values that may be used to design and prepare a strengthened glass sheet that has a frangibility index that is less than 3 (i.e., non-frangible or substantially non-frangible behavior having a probability of 5% or less that a glass plate or glass article will exhibit frangible behavior) as expected in equation (3). As a result, non-frangible strengthened glass articles can be made at certain thicknesses and strengthened so as to have a greater threshold central tension CT than previously believed possible.

In one embodiment, a strengthened glass article manufactured pursuant to equation (5) (e.g., strengthened glass article 300) is non-frangible, substantially non-frangible, or free of frangible behavior, as described hereinabove. That is, strengthened glass article 300 has a frangibility index, as described in Table 1 herein, of less than 3. Upon impact with a force sufficient to cause fragmentation of strengthened glass 300, the percentage $n_1$ of the population of the fragments having a diameter (i.e., maximum dimension) of less than or equal to 1 mm ("Fragment size" in Table 1) is less than or equal to 5% (i.e., $0\% \leq n_1 \leq 5\%$); the number of fragments formed per unit area (in this instance, cm²) $n_2$ of the sample ("Fragment density" in Table 1) is less than or equal to 3 fragments/cm²; the number of cracks $n_3$ branching from the initial crack formed upon impact ("Crack branching" in Table 1) is less than or equal to 5 (i.e., $0 \leq n_3 \leq 5$); and the percentage of the population of fragments $n_4$ that is ejected upon impact more than about 5 cm (or about 2 inches) from their original position ("Ejection" in Table 1) is less than or equal to 2% (i.e., $0\% \leq n_4 \leq 2\%$).

The strengthened glass articles described herein may comprise numerous compositions. In one embodiment, the strengthened glass article comprises an alkali aluminosilicate glass. In one particular embodiment, the alkali aluminosilicate glass has the composition: 66.7 mol % $SiO_2$; 10.5 mol % $Al_2O_3$; 0.64 mol % $B_2O_3$; 13.8 mol % $Na_2O$; 2.06 mol % $K_2O$; 5.50 mol % MgO; 0.46 mol % CaO; 0.01 mol % $ZrO_2$; 0.34 mol % $As_2O_3$; and 0.007 mol % $Fe_2O_3$. In another particular embodiment, the alkali aluminosilicate glass has the composition: 66.4 mol % $SiO_2$; 10.3 mol % $Al_2O_3$; 0.60 mol % $B_2O_3$; 14.0 mol % $Na_2O$; 2.10 mol % $K_2O$; 5.76 mol % MgO; 0.58 mol % CaO; 0.01 mol % $ZrO_2$; 0.21 mol % $SnO_2$; and 0.007 mol % $Fe_2O_3$.

In one embodiment, the alkali aluminosilicate glass comprises: from about 64 mol % to about 68 mol % $SiO_2$; from about 12 mol % to about 16 mol % $Na_2O$; from about 8 mol % to about 12 mol % $Al_2O_3$; from 0 mol % to about 3 mol % $B_2O_3$; from about 2 mol % to about 5 mol % $K_2O$; from about 4 mol % to about 6 mol % MgO; and from 0 mol % to about 5 mol % CaO; wherein: 66 mol %$\leq SiO_2+B_2O_3+CaO \leq 69$ mol %; $Na_2O+K_2O+B_2O_3+MgO+CaO+SrO>10$ mol %; 5 mol %$\leq MgO+CaO+SrO \leq 8$ mol %; $(Na_2O+B_2O_3)-Al_2O_3 \geq 2$ mol %; 2 mol %$\leq Na_2O-Al_2O_3 \leq 6$ mol %; and 4 mol %$\leq (Na_2O+K_2O)-Al_2O_3 \leq 10$ mol %. The glass is described in U.S. Pat. No. 7,666,511 by Adam J. Ellison et al., entitled "Down-Drawable, Chemically Strengthened Glass for Cover Plate," filed Jul. 27, 2007, and claiming priority to U.S. Provisional Patent Application No. 60/930,808, filed on May 18, 2007, the contents of which are incorporated herein by reference in their entirety.

In another embodiment, the alkali aluminosilicate glass comprises: at least one of alumina and boron oxide, and at least one of an alkali metal oxide and an alkaline earth metal oxide, wherein $-15$ mol %$\leq (R_2O+R'O-Al_2O_3-ZrO_2)-B_2O_3 \leq 4$ mol %, where R is one of Li, Na, K, Rb, and Cs, and R' is one of Mg, Ca, Sr, and Ba. In some embodiments, the alkali aluminosilicate glass comprises: from about 62 mol % to about 70 mol. % $SiO_2$; from 0 mol % to about 18 mol % $Al_2O_3$; from 0 mol % to about 10 mol % $B_2O_3$; from 0 mol % to about 15 mol % $Li_2O$; from 0 mol % to about 20 mol % $Na_2O$; from 0 mol % to about 18 mol % $K_2O$; from 0 mol % to about 17 mol % MgO; from 0 mol % to about 18 mol % CaO; and from 0 mol % to about 5 mol % $ZrO_2$. The glass is described in U.S. patent application Ser. No. 12/277,573 by Matthew J. Dejneka et al., entitled "Glasses Having Improved Toughness And Scratch Resistance," filed Nov. 25, 2008, and claiming priority to U.S. Provisional Patent Application No. 61/004,677, filed on Nov. 29, 2008, the contents of which are incorporated herein by reference in their entirety.

In another embodiment, the alkali aluminosilicate glass comprises: from about 60 mol % to about 70 mol % $SiO_2$; from about 6 mol % to about 14 mol % $Al_2O_3$; from 0 mol % to about 15 mol % $B_2O_3$; from 0 mol % to about 15 mol % $Li_2O$; from 0 mol % to about 20 mol % $Na_2O$; from 0 mol % to about 10 mol % $K_2O$; from 0 mol % to about 8 mol % MgO; from 0 mol % to about 10 mol % CaO; from 0 mol % to about 5 mol % $ZrO_2$; from 0 mol % to about 1 mol % $SnO_2$; from 0 mol % to about 1 mol % $CeO_2$; less than about 50 ppm $As_2O_3$; and less than about 50 ppm $Sb_2O_3$; wherein 12 mol %$\leq Li_2O+Na_2O+K_2O \leq 20$ mol % and 0 mol %$\leq MgO+CaO \leq 10$ mol %. In certain embodiments, the glass comprises 60-72 mol % $SiO_2$; 6-14 mol % $Al_2O_3$; 0-15 mol % $B_2O_3$; 0-1 mol % $Li_2O$; 0-20 mol % $Na_2O$; 0-10 mol % $K_2O$; 0-2.5 mol % CaO; 0-5 mol % $ZrO_2$; 0-1 mol % $SnO_2$; and 0-1 mol % $CeO_2$, wherein 12 mol %$\leq Li_2O+Na_2O+K_2O \leq 20$ mol %, and less than 50 ppm $As_2O_3$. The glasses are described in U.S. Pat. No. 8,158,543 by Sinue Gomez et al., entitled "Fining Agents for Silicate Glasses," filed Feb. 25, 2009, and U.S. patent application Ser. No. 13/495,355 by Sinue Gomez et al., entitled "silicate Glasses Having Low Seed Concentration," filed Jun. 13, 2012, both of which claim priority to U.S. Provisional Patent Application No. 61/067,130, filed on Feb. 26, 2008, the contents of which are incorporated herein by reference in their entirety.

In another embodiment, the alkali aluminosilicate glass comprises

In another embodiment, the alkali aluminosilicate glass comprises $SiO_2$ and $Na_2O$, wherein the glass has a temperature $T_{35kp}$ at which the glass has a viscosity of 35 kilo poise (kpoise), wherein the temperature $T_{breakdown}$ at which zircon breaks down to form $ZrO_2$ and $SiO_2$ is greater than $T_{35kp}$. In some embodiments, the alkali aluminosilicate glass comprises: from about 61 mol % to about 75 mol % $SiO_2$; from about 7 mol % to about 15 mol % $Al_2O_3$; from 0 mol % to about 12 mol % $B_2O_3$; from about 9 mol % to about 21 mol % $Na_2O$; from 0 mol % to about 4 mol % $K_2O$; from 0 mol % to about 7 mol % MgO; and 0 mol % to about 3 mol % CaO. The glass is described in U.S. patent application Ser. No. 12/856,840 by Matthew J. Dejneka et al., entitled "Zircon Compatible Glasses for Down Draw," filed Aug. 10, 2010, and claiming priority to U.S. Provisional Patent Application No. 61/235,762, filed on Aug. 29, 2009, the contents of which are incorporated herein by reference in their entirety.

In another embodiment, the alkali aluminosilicate glass comprises at least 50 mol % $SiO_2$ and at least one modifier selected from the group consisting of alkali metal oxides and alkaline earth metal oxides, wherein $[(Al_2O_3 \text{ (mol \%)} + B_2O_3 \text{ (mol \%)})/(\Sigma \text{ alkali metal modifiers (mol \%)})] > 1$. In some embodiments, the alkali aluminosilicate glass comprises: from 50 mol % to about 72 mol % $SiO_2$; from about 9 mol % to about 17 mol % $Al_2O_3$; from about 2 mol % to about 12 mol % $B_2O_3$; from about 8 mol % to about 16 mol % $Na_2O$; and from 0 mol % to about 4 mol % $K_2O$. The glass is described in U.S. patent application Ser. No. 12/858,490 by Kristen L. Barefoot et al., entitled "Crack And Scratch Resistant Glass and Enclosures Made Therefrom," filed Aug. 18, 2010, and claiming priority to U.S. Provisional Patent Application No. 61/235,767, filed on Aug. 21, 2009, the contents of which are incorporated herein by reference in their entirety.

In another embodiment, the alkali aluminosilicate glass comprises $SiO_2$, $Al_2O_3$, $P_2O_5$, and at least one alkali metal oxide ($R_2O$), wherein $0.75 \leq [(P_2O_5 \text{ (mol \%)} + R_2O \text{ (mol \%)})/M_2O_3 \text{ (mol \%)}] \leq 1.2$, where $M_2O_3 = Al_2O_3 + B_2O_3$. In some embodiments, the alkali aluminosilicate glass comprises: from about 40 mol % to about 70 mol % $SiO_2$; from 0 mol % to about 28 mol % $B_2O_3$; from 0 mol % to about 28 mol % $Al_2O_3$; from about 1 mol % to about 14 mol % $P_2O_5$; and from about 12 mol % to about 16 mol % $R_2O$; and, in certain embodiments, from about 40 to about 64 mol % $SiO_2$; from 0 mol % to about 8 mol % $B_2O_3$; from about 16 mol % to about 28 mol % $Al_2O_3$; from about 2 mol % to about 12% $P_2O_5$; and from about 12 mol % to about 16 mol % $R_2O$. The glass is described in U.S. patent application Ser. No. 13/305,271 by Dana C. Bookbinder et al., entitled "Ion Exchangeable Glass with Deep Compressive Layer and High Damage Threshold," filed Nov. 28, 2011, and claiming priority to U.S. Provisional Patent Application No. 61/417,941, filed Nov. 30, 2010, the contents of which are incorporated herein by reference in their entirety.

In still other embodiments, the alkali aluminosilicate glass comprises at least about 4 mol % $P_2O_5$, wherein $(M_2O_3 \text{ (mol \%)}/R_xO \text{(mol \%)}) < 1$, wherein $M_2O_3 = Al_2O_3 + B_2O_3$, and wherein $R_xO$ is the sum of monovalent and divalent cation oxides present in the alkali aluminosilicate glass. In some embodiments, the monovalent and divalent cation oxides are selected from the group consisting of $Li_2O$, $Na_2O$, $K_2O$, $Rb_2O$, $Cs_2O$, MgO, CaO, SrO, BaO, and ZnO. In some embodiments, the glass comprises 0 mol % $B_2O_3$. The glass is described in U.S. patent application Ser. No. 13/677,805 by Timothy M. Gross, entitled "Ion Exchangeable Glass with High Crack Initiation Threshold," filed Nov. 15, 2012, and claiming priority to U.S. Provisional Patent Application No. 61/560,434 filed Nov. 16, 2011, the contents of which are incorporated herein by reference in their entirety.

In still another embodiment, the alkali aluminosilicate glass comprises at least about 50 mol % $SiO_2$ and at least about 11 mol % $Na_2O$, and the compressive stress is at least about 900 MPa. In some embodiments, the glass further comprises $Al_2O_3$ and at least one of $B_2O_3$, $K_2O$, MgO and ZnO, wherein $-340 + 27.1 \cdot Al_2O_3 - 28.7 \cdot B_2O_3 + 15.6 \cdot Na_2O - 61.4 \cdot K_2O + 8.1 \cdot (MgO + ZnO) \geq 0$ mol %. In particular embodiments, the glass comprises: from about 7 mol % to about 26 mol % $Al_2O_3$; from 0 mol % to about 9 mol % $B_2O_3$; from about 11 mol % to about 25 mol % $Na_2O$; from 0 mol % to about 2.5 mol % $K_2O$; from 0 mol % to about 8.5 mol % MgO; and from 0 mol % to about 1.5 mol % CaO. The glass is described in U.S. patent application Ser. No. 13/533,298 by Matthew J. Dejneka et al., entitled "Ion Exchangeable Glass with High Compressive Stress," filed Jun. 26, 2011, and claiming priority to U.S. Provisional Patent Ion Application No. 61/503,734, filed Jul. 1, 2011, the contents of which are incorporated herein by reference in their entirety.

In other embodiments, the alkali aluminosilicate glass comprises at least about 50 mol % $SiO_2$; at least about 10 mol % $R_2O$, wherein $R_2O$ comprises $Na_2O$; $Al_2O_3$, wherein $-0.5$ mol % $\leq Al_2O_3$ (mol %) $- R_2O$ (mol %) $\_2$ mol %; and $B_2O_3$, and wherein $B_2O_3$ (mol %) $- (R_2O$ (mol %) $- Al_2O_3$ (mol %)) $\geq 4.5$ mol %. In particular embodiments, the glass comprises at least about 50 mol % $SiO_2$, from about 12 mol % to about 22 mol % $Al_2O_3$; from about 4.5 mol % to about 10 mol % $B_2O_3$; from about 10 mol % to about 20 mol % $Na_2O$; from 0 mol % to about 5 mol % $K_2O$; at least about 0.1 mol % MgO, ZnO, or combinations thereof, wherein 0 mol % $\leq MgO \leq 6$ and $0 \leq ZnO \leq 6$ mol %; and, optionally, at least one of CaO, BaO, and SrO, wherein 0 mol % $\leq CaO + SrO + BaO \leq 2$ mol %. The glass is described in U.S. Provisional Patent Application No. 61/653,485 by Matthew J. Dejneka et al., entitled "Ion Exchangeable Glass with High Damage Resistance," filed May 31, 2012, the contents of which are incorporated by reference in their entirety.

In other embodiments, the alkali aluminosilicate glass comprises at least about 50 mol % $SiO_2$; at least about 10 mol % $R_2O$, wherein $R_2O$ comprises $Na_2O$; $Al_2O_3$, wherein $Al_2O_3$ (mol %) $< R_2O$ (mol %); and $B_2O_3$, and wherein $B_2O_3$ (mol %) $- (R_2O$ (mol %) $- Al_2O_3$ (mol %)) $\geq 3$ mol %. In certain embodiments, the glass comprises at least about 50 mol % $SiO_2$, from about 9 mol % to about 22 mol % $Al_2O_3$; from about 3 mol % to about 10 mol % $B_2O_3$; from about 9 mol % to about 20 mol % $Na_2O$; from 0 mol % to about 5 mol % $K_2O$; at least about 0.1 mol % MgO, ZnO, or combinations thereof, wherein $0 \leq MgO \leq 6$ mol % and $0 \leq ZnO \leq 6$ mol %; and, optionally, at least one of CaO, BaO, and SrO, wherein 0 mol % $\leq CaO + SrO + BaO \leq 2$ mol %. In certain embodiments, the glass has a zircon breakdown temperature that is equal to the temperature at which the glass has a viscosity in a range from about 30 kPoise to about 40 kPoise. The glass is described in U.S. Provisional Patent Application No. 61/653,489 by Matthew J. Dejneka et al., entitled "Zircon Compatible, Ion Exchangeable Glass with High Damage Resistance," filed May 31, 2012, the contents of which are incorporated by reference in their entirety.

In some embodiments, the alkali aluminosilicate glasses described hereinabove are substantially free of (i.e., contain 0 mol % of) of at least one of lithium, boron, barium, strontium, bismuth, antimony, and arsenic.

In some embodiments, the alkali aluminosilicate glasses described hereinabove are down-drawable by processes known in the art, such as slot-drawing, fusion drawing, re-drawing, and the like, and has a liquidus viscosity of at least 130 kilopoise.

In one embodiment, the glass articles described herein, such as glass article 300, are chemically strengthened by ion exchange. In this process, ions in the surface layer of the glass are replaced by—or exchanged with—larger ions having the same valence or oxidation state. In those embodiments in which the glass article comprises, consists essentially of, or consists of an alkali aluminosilicate glass, ions in the surface layer of the glass and the larger ions are monovalent alkali metal cations, such as Li$^+$ (when present in the glass), Na$^+$, K$^+$, Rb$^+$, and Cs$^+$. Alternatively, monovalent cations in the surface layer may be replaced with monovalent cations other than alkali metal cations, such as Ag$^+$ or the like.

Ion exchange processes are typically carried out by immersing a glass article in a molten salt bath containing the larger ions to be exchanged with the smaller ions in the glass. It will be appreciated by those skilled in the art that parameters for the ion exchange process, including, but not limited to, bath composition and temperature, immersion time, the number of immersions of the glass in a salt bath (or baths), use of multiple salt baths, additional steps such as annealing, washing, and the like, are generally determined by the composition of the glass and the desired depth of layer and compressive stress of the glass as a result of the strengthening operation. By way of example, ion exchange of alkali metal-containing glasses may be achieved by immersion in at least one molten bath containing a salt such as, but not limited to, nitrates, sulfates, and chlorides of the larger alkali metal ion. The temperature of the molten salt bath typically is in a range from about 380° C. up to about 450° C., while immersion times range from about 15 minutes up to about 16 hours. However, temperatures and immersion times different from those described above may also be used. Such ion exchange treatments typically result in strengthened alkali aluminosilicate glasses having depths of layer ranging from about 10 μm up to at least 50 μm with a compressive stress ranging from about 200 MPa up to about 800 MPa, and a central tension of less than about 200 MPa.

Non-limiting examples of ion exchange processes are provided in the U.S. patent applications and provisional patent applications that have been previously referenced hereinabove. In addition, non-limiting examples of ion exchange processes in which glass is immersed in multiple ion exchange baths, with washing and/or annealing steps between immersions, are described in U.S. patent application Ser. No. 12/500,650, by Douglas C. Allan et al., entitled "Glass with Compressive Surface for Consumer Applications," and claiming priority to U.S. Provisional Patent Application No. 61/079,995, filed Jul. 11, 2008, in which glass is strengthened by immersion in multiple, successive, ion exchange treatments in salt baths of different concentrations; and U.S. Pat. No. 8,312,739 by Christopher M. Lee et al., entitled "Dual Stage Ion Exchange for Chemical Strengthening of Glass," filed Jul. 28, 2009, and claiming priority to U.S. Provisional Patent Application No. 61/084,398, filed Jul. 29, 2008, in which glass is strengthened by ion exchange in a first bath is diluted with an effluent ion, followed by immersion in a second bath having a smaller concentration of the effluent ion than the first bath. The contents of U.S. Provisional Patent Application Nos. 61/079,995 and No. 61/084,398 are incorporated herein by reference in their entirety.

In one embodiment, the glass is down-drawable by processes known in the art, such as slot-drawing, fusion drawing, re-drawing, and the like, and has a liquidus viscosity of at least 130 kilopoise.

In some embodiments, the strengthened glass article has a thickness of up to about 2 mm, and, in a particular embodiment, the thickness is in a range from about 0.1 mm up to about 2 mm. In another embodiment, the thickness of the glass article is in a range from about 0.1 mm up to about 0.7 mm, from about 0.5 mm up to about 0.75 mm or, in another embodiment, from about 0.9 mm up to about 2 mm.

In further embodiments, the strengthened glass article also may be substantially non-frangible at lower thicknesses, for example, thicknesses less than 0.5 mm. In another embodiment, the strengthened glass article may include a thickness, defined as follows: $0.3 \leq t < 0.5$ mm. In yet another embodiment, the thickness of the strengthened glass article may be between 0.3 to 0.45 mm.

Moreover, the outer region of the strengthened glass article may have a depth of layer of at least 30 μm and a compressive stress of at least 600 MPa. In further embodiments, the depth of layer may be at least about 40 μm, or at least about 52 μm. Further, the outer region of the strengthened glass article may comprise a compressive stress of greater than 700 MPa, or between about 700 to 800 MPa.

Methods of making a strengthened glass article that is substantially non-frangible, or free of frangible behavior, (i.e., having a frangibility index, as described herein, of less than 3) is also provided. A glass article having a thickness t is first provided. The glass article, in one embodiment, is an alkali aluminosilicate glass, such as those described hereinabove. A compressive stress CS is created in an outer region of the glass article to strengthen the glass article. The compressive stress CS is sufficient to generate a central tension CT in a central region of the glass article such that CT (MPa)$\leq -38.7$ (MPa/mm)·ln(t)(mm)+48.2 (MPa). In one embodiment, compressive stress CS is sufficient to generate a central tension CT in a central region of the glass article such that $-15.7\ t+52.5 \leq CT \leq -38.7\ \ln(t)+48.2$. The glass article, in another embodiment, is an alkali aluminosilicate glass, such as those described hereinabove. A compressive stress CS is created in an outer region of the glass article to strengthen the glass article. The compressive stress CS is sufficient to generate a central tension CT in a central region of the glass article such that CT (MPa)$\leq 57$ (MPa)$-9.0$ (MPa/mm)·ln(t)(mm)+49.3 (MPa/mm)·ln$^2$(t)(mm).$-38.7$ (MPa/mm)·ln(t)(mm)+48.2 (MPa). In another embodiment, compressive stress CS is sufficient to generate a central tension CT in a central region of the glass article such that $-15.7\ t+52.5 \leq CT \leq 57$ (MPa)$-9.0$ (MPa/mm)·ln(t)(mm)+49.3 (MPa/mm)·ln$^2$(t)(mm) or $-38.7$ (MPa/mm)·ln(t)(mm)+48.2 (MPa)$\leq CT$ (MPa)$\leq 57$ (MPa)$-9.0$ (MPa/mm)·ln(t)(mm)+49.3 (MPa/mm) ln$^2$(t) (mm).

In one embodiment, the compressive stress is created by chemically strengthening the glass article, for example, by the ion exchange processes, previously described herein, in which a plurality of first metal ions in the outer region of the glass article is exchanged with a plurality of second metal ions so that the outer region comprises the plurality of the second metal ions. Each of the first metal ions has a first ionic radius and each of the second alkali metal ions has a second ionic radius. The second ionic radius is greater than the first ionic radius, and the presence of the larger second alkali metal ions in the outer region creates the compressive stress in the outer region.

At least one of the first metal ions and second metal ions are preferably ions of an alkali metal. The first ions may be ions of lithium, sodium, potassium, and rubidium. The second metal ions may be ions of one of sodium, potassium, rubidium, and cesium, with the proviso that the second alkali metal ion has an ionic radius greater than the ionic radius than the first alkali metal ion.

Strengthened glass articles (such as glass article 300, shown in FIG. 3) 300 can be used as a protective cover plate (as used herein, the term "cover plate" includes windows or the like) for display and touch screen applications, such as, but not limited to, portable communication and entertainment devices such as telephones, music players, video players, or the like; and as a display screen for information-related terminal (IT) (e.g., portable or laptop computers) devices; as well as in other applications.

While typical embodiments have been set forth for the purpose of illustration, the foregoing description should not be deemed to be a limitation on the scope of the disclosure or appended claims. For example, processes other than ion exchange may be used to strengthen the glass, and different means of strengthening the glass may be used in combination with each other to achieve compressive stress within the glass. In one alternative embodiment, metal ions, such as silver or the like, may be used instead of—or in combination with—alkali metal ions in the ion exchange process. Accordingly, various modifications, adaptations, and alternatives may occur to one skilled in the art without departing from the spirit and scope of the present disclosure or appended claims.

The invention claimed is:

1. A strengthened glass article, the strengthened glass article having a thickness t<0.5 mm and comprising:
    an outer region, the outer region extending from a surface of the article to a depth of layer DOL within the article, wherein the outer region is under a compressive stress CS; and
    an inner region, wherein the inner region is under a central tension CT, and wherein $-38.7$ (MPa/mm)·ln(t)(mm)+48.2 (MPa)<CT(MPa)≤57 (MPa)−9.0 (MPa/mm)·ln(t)(mm)+49.3 (MPa/mm)·ln$^2$(t)(mm).

2. The strengthened glass article of claim 1, wherein the strengthened glass article, when subjected to a point impact sufficient to break the strengthened glass article, has a frangibility index of less than 3.

3. The strengthened glass article of claim 2, wherein when the strengthened glass article is broken by the point impact, the strengthened glass article exhibits at least one of fragment size $n_1$ (%≤1 mm) of 0%≤$n_1$≤5%, fragment density $n_2$ (fragments/cm$^2$) of 0 fragments/cm$^2$≤$n_2$≤3 fragments/cm$^2$, crack branching $n_3$ of 0≤$n_3$≤5 and ejection $n_4$ (%≥5 cm) of 0%≤$n_4$≤2%, or combinations thereof.

4. The strengthened glass article of claim 1, wherein the outer layer comprises a depth of layer of at least 30 μm and a compressive stress of at least 600 MPa.

5. The strengthened glass article of claim 4, wherein the outer layer comprises a compressive stress of at least about 700 MPa.

6. The strengthened glass article of claim 4, wherein the outer layer comprises a depth of layer of at least about 52 μm.

7. The strengthened glass article of claim 1, wherein the thickness of the strengthened glass article is 0.3≤t<0.5 mm.

8. The strengthened glass article of claim 7, wherein the thickness of the strengthened glass article is 0.3≤t≤0.45 mm.

9. The strengthened glass article of claim 1, wherein the strengthened glass article comprises an alkali aluminosilicate glass, wherein the alkali aluminosilicate glass comprises: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-10 mol % CaO; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol %≤$Li_2O$+$Na_2O$+$K_2O$≤20 mol % and 0 mol %≤MgO+CaO≤10 mol %.

10. A strengthened glass article, the strengthened glass article having a thickness t<0.5 mm and comprising:
    an outer region, the outer region extending from a surface of the article to a depth of layer DOL within the article, wherein the outer region is under a compressive stress CS; and
    an inner region under a central tension CT, wherein CT (MPa)>−38.7 (MPa/mm)·ln(t)(mm)+48.2 (MPa), and wherein the strengthened glass article has a frangibility index of less than 3 when subjected to a point impact that is sufficient to break the strengthened glass article.

11. The strengthened glass article of claim 10, wherein when the strengthened glass article is broken by the point impact, the strengthened glass article exhibits at least one of fragment size $n_1$ (%≤1 mm) of 0%≤$n_1$≤5 5%, fragment density $n_2$ (fragments/cm$^2$) of 0 fragments/cm$^2$≤$n_2$≤3 fragments/cm$^2$, crack branching $n_3$ of 0≤$n_3$≤5 and ejection $n_4$ (%≤5 cm) of 0%≤n4≤2%, or combinations thereof.

12. The strengthened glass article of claim 10, wherein the outer layer comprises a depth of layer of at least 30 μm and a compressive stress of at least 600 MPa.

13. The strengthened class article of claim 10, wherein the outer layer has a compressive stress of at least 700 MPa.

14. The strengthened glass article of claim 10, wherein the outer layer has a depth of layer of at least about 52 μm.

15. The strengthened glass article of claim 10, wherein the thickness of the strengthened glass article is 0.3≤t<0.5 mm.

16. The strengthened glass article of claim 15, wherein the thickness of the strengthened glass article is 0.3≤t≤0.45 mm.

17. The strengthened glass article of claim 10, wherein the strengthened glass article comprises an alkali aluminosilicate glass, wherein the alkali aluminosilicate glass comprises: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-10 mol % CaO; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol %≤$Li_2O$+$Na_2O$+$K_2O$≤20 mol % and 0 mol %≤MgO+CaO≤10 mol %.

18. A strengthened glass article, the strengthened glass article having a thickness t<0.5 mm and comprising:
    an outer region extending from a surface of the article to a depth of layer DOL of at least 30 pm within the article, wherein the outer region is under a compressive stress CS of at least 600 MPa; and
    an inner region, wherein the inner region is under a central tension CT, and wherein $-38.7$ (MPa/mm)·ln(t)(mm)+48.2 (MPa)≤CT (MPa)≤57 (MPa)−9.0 (MPa/mm)·ln(t)(mm)+49.3 (MPa/mm)·ln$^2$ (t)(mm),
    wherein the strengthened glass article has a frangibility index of less than 3 when subjected to a point impact sufficient to break the strengthened glass article.

19. The strengthened glass article of claim 18, wherein when the strengthened glass article is broken by the point impact, the strengthened glass article exhibits at least one of fragment size $n_1$ (%≤1 mm) of 0%≤$n_1$≤5%, fragment density $n_2$ (fragments/cm$^2$) of 0 fragments/cm$^2$≤$n_2$≤3 fragments/cm$^2$, crack branching $n_3$ of 0≤$n_3$≤5 and ejection $n_4$ (%≥5 cm) of 0%≤$n_4$≤2%, or combinations thereof.

20. The strengthened glass article of claim 18, wherein the outer layer comprises a compressive stress of at least 700 MPa.

21. The strengthened glass article of claim 18, wherein the outer layer comprises a depth of layer of at least about 52 μm.

22. The strengthened glass article of claim 18, wherein the thickness of the strengthened glass article is 0.3≤t<0.5 mm.

23. The strengthened glass article of claim 22, wherein the thickness of the strengthened glass article is 0.3≤t≤0.45 mm.

24. The strengthened glass article of claim 18, wherein the strengthened glass article comprises an alkali aluminosilicate glass, wherein the alkali aluminosilicate glass comprises: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-10 mol % CaO; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol % $\leq Li_2O+Na_2O+K_2O \leq 20$ mol % and 0 mol % $\leq MgO+CaO \leq 10$ mol %.

* * * * *

UNITED STATES PATENT AND TRADEMARK OFFICE
CERTIFICATE OF CORRECTION

| | | |
|---|---|---|
| PATENT NO. | : 9,499,431 B2 | Page 1 of 1 |
| APPLICATION NO. | : 14/405041 | |
| DATED | : November 22, 2016 | |
| INVENTOR(S) | : Barefoot et al. | |

It is certified that error appears in the above-identified patent and that said Letters Patent is hereby corrected as shown below:

In the Claims

In Column 18, Line 21, in Claim 13, delete "class" and insert -- glass --

In Column 18, Line 41, in Claim 18, delete "30 pm" and insert -- 30μm --

Signed and Sealed this
Thirty-first Day of December, 2024

Derrick Brent
*Acting Director of the United States Patent and Trademark Office*